United States Patent Office 3,200,142
Patented Aug. 10, 1965

3,200,142
SURFACE-ACTIVE COMONOMER AND METHOD
OF PREPARATION
Rafael L. Bowen, Bethesda, Md., assignor to the United
States of America as represented by the Secretary of
the Department of Health, Education, and Welfare
No Drawing. Filed Feb. 1, 1963, Ser. No. 263,373
4 Claims. (Cl. 260—486)

This invention relates to a means of obtaining significantly improved adhesion between certain polymers and substrates. These improved polymers can be stably bound to external dental surfaces, to the walls of dental cavities, and to solid surfaces containing metals or metallic ions.

At the present time, none of the dental restorative materials have a significant degree of specific chemical or physical adhesion to the hard tooth tissues, and the retention of materials requires mechanical locking. This severely limits the application of the materials and requires the removal of extra healthy tooth structure for providing this mechanical retention. The direct filling resins which are used at present, because they have no bonding to the cavity walls, permit the development of secondary decay at the tooth-filling interface in a large proportion of cases.

It is, therefore, an immediate object of the present invention to provide a means of forming a water-resistant seal or bond between the polymer-containing direct filling material and the tooth cavity walls.

Another object of the invention is to provide improved means for bonding between polymeric materials and external tooth surfaces so that orthodontists may be able to give better service in the attachment of their appliances; so that periodontists may use better splinting technics; so that prosthodontists will obtain better results in the cementing of their abutments; and so that general practitioners will be able to provide caries prevention by the filling of developmental pits and fissures.

Other, further, and more specific objects of this invention will become readily apparent to persons skilled in the art from a consideration of the following description, including specific examples. For instance, the present invention may provide improved bonding between certain polymers to be further described hereinafter, and solid surfaces containing metals or metal ions.

The direct filling resins most commonly used in dentistry at the present time consist primarily of methyl methacrylate monomer, with or without lesser amounts of other compatible monomeric materials, and a polymeric powder containing benzoyl peroxide or other suitable peroxide initiator. The powder and liquid are mixed together to produce a slurry; the slurry must contain a reducing agent which serves as an accelerator for the breakdown of benzoyl peroxide or other peroxide which in turn releases free radicals which attack the monomeric component thus initiating its polymerization. The polymerization precedes by a free radical mechanism until most of the monomer is converted to polymer. This polymerization, or hardening process, can and does occur in the dental cavity, and the present invention provides a means by which this kind of polymer can become stably bound to the cavity walls. Alternatively, other suitable polymerizing monomers and their polymers such as described in the U.S. Patent No. 3,066,112, may be bound to solid surfaces containing metals or metal ions, such as calcium. Other polymerizing monomers and their polymers such as polyester resins and other resins polymerizing by means of free radicals may utilize the present invention for obtaining improved bonding to surfaces containing metallic ions or metals.

The term surface-active comonomers is applied to the group of compounds of the present invention because it is a descriptive term appropriate to members of this group. The term surface-active limits the group to agents which have surface-activity in the usual sense of the word, that is, those materials which concentrate on surfaces at the expense of solution concentration. They typically consist of polar non-polar type molecules. The portion of low polarity is commonly hydrocarbon, unsaturated or saturated, and tends to be soluble in oil (organophilic) and insoluble in water (hydrophobic). The polar portion, or water soluble (hydrophilic) group, may be oxygen containing, may contain esters or ethers, may contain sulfur or may contain phosphorous or nitrogen. For the present purposes of description, surface-activity will be determined operationally by the method of Iler, R. K., U.S. Patent No. 2,657,149 (column 19, lines 28 to 54). In this test, Iler distinguishes powders which are hydrophilic from powders which are organophilic or hydrophobic. For the present purposes surface-active agents are those agents which, when added to a system containing distilled water, n-butanol, and powdered substrate which is innately hydrophilic, will change the apparent nature of the powdered substrate to become organophilic or hydrophobic.

The term surface-active comonomers also restricts these compounds to agents which are capable of copolymerization or homopolymerization. Tests for the ability to polymerize or copolymerize are well known to the art and need not be further defined or described here. Thus, a surface-active comonomer may be described as a molecule, one end of which consists of a polar group making the molecule surface-active for a given surface and the other end containing one or more relatively non-polar group or groups capable of copolymerization with the material to be bonded to the surface. The polymerizable end and the polar end of the molecule should be separated by some distance, preferably with a flexible hydrocarbon chain. This would serve to free the polymerizable group from steric hindrance and to separate the charge or charges of the ionic polar portion of the monomer and those of the growing chain radical so that the polymerizable group may approach the chain radical for reaction.

It must be kept clear that the polar group will be determined by the nature of the substrate surface, and the polymerizable group or groups will be determined by the nature of the polymerizing monomer and its polymer. It should be clear that the example to follow with its embodiment of the present invention does not limit the invention to this polymer to be bonded, surface-active comonomer mediating the bonding, and substrate of the bonding, and it should be understood of course that this disclosure relating in detail to only one of the embodiments of the invention does not obviate the changes and modifications of the surface-active agents making them suitable for other substrates and other polymerizing resins.

In the following examples the substrates will be human dentin, human enamel, and single-crystal fluorapatite surfaces. The polymerizing monomer and polymer will be that of methyl methacrylate. This resin was selected as an example because it is a typical, commonly used resin for the direct filling of dental cavities. Ordinarily the methyl methacrylate monomer contains about 0.5 percent N,N-dimethyl-p-toluidene reducing agent (accelerator for the peroxide decomposition) and the polymer powder contains 0.5 to 0.75 percent benzoyl peroxide initiator. Once the polymer and substrate have been determined, the surface-active comonomer is determined by the above operational definitions. In the case of the present example, the selection of the appropriate polar group, which would make the molecule surface-active for this given substrate, was determined by trial and error with various surface-active agents and powdered substrates in the surface-activity test described above. By this test method, the polar groups, making this type of molecule surface-active for this particular substrate, had an increasing order of effectiveness as follows: hydroxyl, amino, carboxyl, and groups theoretically capable of forming a five-atom amphoteric chelate ring with calcium. The affinity of this surface for water would be placed between that for hydroxyl and amino groups. For the present example the polymerizable group of the surface-active comonomer was a methacrylate group, making the surface-active comonomer capable of polymerizing (or copolymerizing) with the resin system.

In the present examples, such a surface-active comonomer, when diluted in an appropriate solvent and applied to a dentin, enamel or fluorapatite substrate prior to an application of a polymerizing resin system, results in a significantly more stable and stronger bond than when the surface-active comonomer was not used, other things being the same. Thus, in the present examples, the surface-active comonomer is applied in the manner of a primer, but its effectiveness should be also obtained by its being admixed with the monomer of the polymerizing system.

METHODS OF PREPARATION OF A SURFACE-ACTIVE COMONOMER

One example of a surface-active comonomer will be described here, although there are conceptually a large number of surface-active comonomers with subtile distinctions which would be suitable for a selected polymer and substrate.

In accordance with one embodiment of the present invention the reaction product of N-phenyl glycine and glycidyl methacrylate, hereinafter abbreviated NPG-GMA, will be described and will serve as an example of a surface-active comonomer for hard tooth tissues and for a methacrylate resin system. The synthesis follows:

Four grams (0.01 mol) of NaOH, were dissolved in 100 milliliters of distilled water. To this was added 15.1 grams (0.1 mol) of N-phenyl glycine (Eastman #393). The solution was filtered on adding to a 300-milliliter reaction flask. This three-neck flask was equipped with dropping funnel, reflux condenser, and stirrer. To this solution 13.1 milliliters (14.2 grams or 0.1 mol) of glycidyl methcrylate (du Pont CP105; the 2,3-epoxy propyl ester of methacrylic acid) was added over five minutes with continuous stirring. Stirring was continued and the temperature rose from 23° C. to 30° C. in 2.5 hours, while a precipitate formed. To this, 400 milliliters of distilled water was added; the pH of the supernatant fluid was 6. The pH was brought up to 8 by the addition of NaOH. The reaction mixture was extracted three times with 100-milliliter portions of diethyl ether. The pH was then adjusted to 4 with HCl and NaHCO₃, yielding a light brown precipitate. The suspension was filtered and the solid product was stored at 5° C. in the dark until used. This crude product will be referred to as NPG-GMA (the addition reaction product of N-phenyl glycine and glycidyl methacrylate); it appeared to contain polymer and other impurities.

Portions of NPG–GMA were reciprocated from hot 1:1 methyl alcohol-water solutions and filtered. This appeared to give a mixture of product and polymer. The complex infrared spectrograph of the product, when compared with those of the intermediates was in agreement with the reactions and structures shown below:

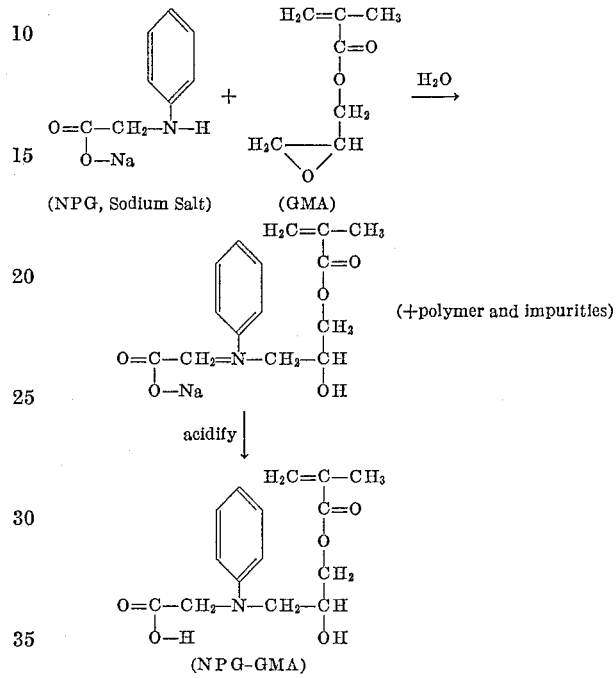

The spontaneous addition reaction of secondary basic amines with oxirane groups:

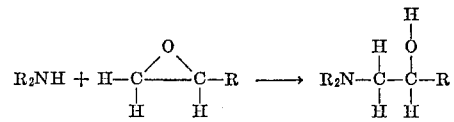

is well known.

When N-phenyl glycine without added base was combined with glycidyl methacrylate (in benzene or 95 percent ethanol), heating was required to yield a reaction; and the product was soluble in acetone but was insoluble in aqueous NaOH, suggesting esterification of the carboxyl group.

The NPG-GMA was not appreciably soluble in water at pH 4 but was soluble in dilute aqueous NaOH, chloroform, methanol and ethanol.

When benzoyl peroxide was added to a methanol solution of NPG-GMA, a precipitate formed (overnight) which was insoluble in methanol and had a melting point above 250° C.

The NPG-GMA compound may be viewed as a polymerizable zwitterion in a hydrated environment; and its surface activity may be, at least in part, due to dipole association augmented by coordinate links of various types. The side chains of dentinal collagen contain anionic, cationic, and hydroxyl groups, and the surface of hydroxyapatite is believed to have localized electrostatic fields radiating out of the mineral surface. However, present theory and scale models suggest that NPG-GMA may be capable of tridentate cholation, satisfying one-half of the valency and three of the six to nine coordination numbers (positions) ascribed to calcium.

The present invention does not require a complete understanding of the mechanism, but only requires that the surface-active comonomer, which is the adhesion promoting agent, be surface-active to the substrate and at the same time be able to copolymerize with the adherend (the polymerizing resin which is to be held to the solid substrate surface).

ADHESION PROPERTIES OBTAINED WITH A SURFACE-ACTIVE COMONOMER

Adhesion tests were conducted to evaluate the efficacy of the surface-active comonomer described in this example. A typical tensile adhesion test was used, similar to those commonly used by persons skilled in the art. In the first study, tensile adhesion, between the direct filling resin described above and six dentin surfaces after soaking for 20 hours in water, was only 0 to 20 p.s.i. (pounds per square inch) when the dentin was treated with: nothing; cavity primer; cavity seal; ethanol; and 5 percent ethanol solutions of oleic acid, Chinawood fatty acid, and N-phenyl glycine. A quick setting and a general purpose epoxy gave similar results. When a 5 percent solution of NPG–GMA (adduct of N-phenyl glycine and glycidyl methacrylate) was applied before the methacrylate resin, the value was between 150 and 320 p.s.i. Re-application of this NPG–GMA solution and resin without resurfacing gave increasing values to 660 p.s.i., which dropped significantly when the dentin was resurfaced before application. This is tentatively interpreted as follows: the NPG–GMA, a surface-active comonomer, significantly improved the bonding between the resin and the dentin surface; the surface condition, produced by the abrasive, was a limiting factor.

In a second evaluation, tensile adhesion, between a direct filling resin and five dentin surfaces after soaking for 20 hours in water, was only 0 to 10 p.s.i. when the dentin was treated with: nothing; 2-hydroxypropyl methacrylate; and 5 percent ethanol solutions of stearic acid, 12-hydroxy stearic acid, stearoyl sarcosine, and oleoyl sarcosine. When a 5 percent solution of NPG–GMA (adduct of N-phenyl glycine and glycidyl methacrylate) was applied before the methacrylate resin, the value was between 390 and 780 p.s.i. Exposure to water for 19 days did not significantly decrease the average bond strength. Pretreatment of the surface with dilute acid or base, followed by rinsing, blotting and then application of the NPG–GMA gave significantly higher adhesion values. Such treatment with 0.01 N NaOH gave 1000 p.s.i. after 4 days in water.

In a third study, more data were obtained and are shown in Table I.

Table I

|  | Adhesion of a Dental Resin to— | | |
| --- | --- | --- | --- |
|  | Dentin | Enamel | Fluorapatite |
| Control (resin only) | 0 | 240 | 910 |
| NPA–GMA Applied before the resin | 510 | 690 | 1,900 |
| EDTA [1] pretreatment and NPG–GMA applied before the resin | 1,100 | 770 | 1,100 |

These average values are in pounds per square inch after soaking in water 1-3 days.
NPG–GMA is the surface-active comonomer.
[1] EDTA is ethylene diamine tetraacetic acid.

In this table it is evident that the surface-active comonomer is effective in improving the bond strength to fluorapatite single-crystal (100) surfaces in the absence of (dental) protein. The statistical evaluation of the ability of a surface-active comonomer to improve the bonding of a polymer to the surface of a solid containing metal atoms (calcium ions) showed it to be highly significant.

As many apparently widely different embodiments of this invention may be made without departing from the spirit and scope thereof, it is to be understood that this invention is not thereby limited to the specific embodiments thereof.

Encompassed by the spirit and scope of the present invention are also other examples of surface-active comonomers such as the following: the addition reaction product of glycidyl methacrylate or glycidyl acrylate and sodium salts of amino acids such as glycine, alanine, serine, threonine, valine, norleucine, leucine, isoleucine, phenylalanine, hydroxyproline, proline, cysteine, cystine, methionine, histidine, and tryptophan; sodium salts of amino acids such as lysine, ornithine, and arginine; and sodium salts of amino acids such as aspartic, glutamic and hydroxyglutamic. Other examples are the addition reaction product of glycidyl methacrylate or glycidyl acrylate with sodium salts of N-mono methylglycine (sarcosine); N-H, N-R-glycine, where R=1 to 20 carbon atoms; imidodiacetic acid, the monoester of imidodiacetic acid with a monohydric alcohol; ethylenediamine acetic acid, ethylenediamine diacetic acid, ethylenediamine triacetic acid; diethylenetriamine acetic acid, diethylenetriamine diacetic acid, diethylenetriamine triacetic acid, diethylenetriamine tetracetic acid; and N-H, N-R' glycine, where R' is an alkylaryl group.

What is claimed is:

1. The method of preparation of a surface active comonomer which comprises admixing in the presence of an aqueous solvent, equimolar quantities of the sodium salt of N-phenyl glycine and a compound selected from the group consisting of glycidyl methacrylate and glycidyl acrylate, subjecting said admixture, with stirring to a temperature between 23° C. to 30° C. for 2.5 hours, and separating the precipitate from the mother liquor by acidification to a pH of approximately 4.

2. The method of preparation of a surface-active comonomer which comprises admixing in the presence of an aqueous solvent, equimolar quantities of the sodium salt of N-phenyl glycine and glycidyl methacrylate, subjecting said admixture with stirring, to a temperature between 23° C. to 30° C. for 2.5 hours, and separating the precipitate from the mother liquor by acidification to a pH of approximately 4.

3. The products of the following formula:

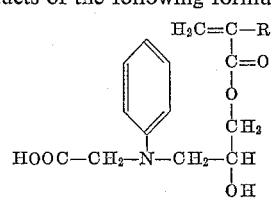

where R is selected from the class consisting of $CH_3$ and H.

4.

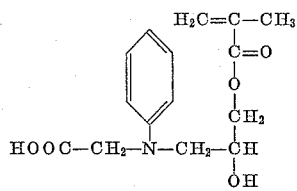

References Cited by the Examiner

UNITED STATES PATENTS

| 2,404,503 | 7/46 | Kharasch | 260—534 |
| 2,817,675 | 12/57 | Hofer | 260—534 X |
| 2,996,521 | 8/61 | Matthews | 260—534 X |

LORRAINE A. WEINBERGER, *Primary Examiner.*

LEON ZITVER, *Examiner.*